Aug. 7, 1951 H. GRAGG 2,563,236
PLASTIC CLAMP
Filed Sept. 20, 1949
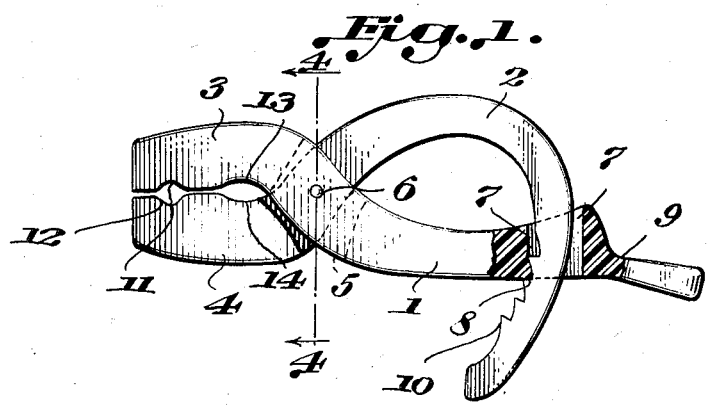
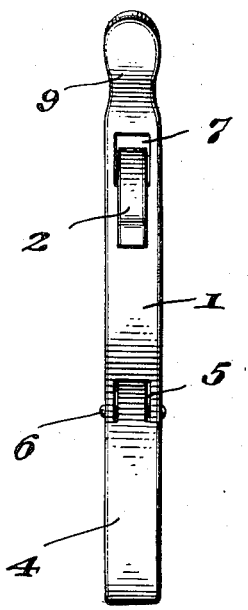
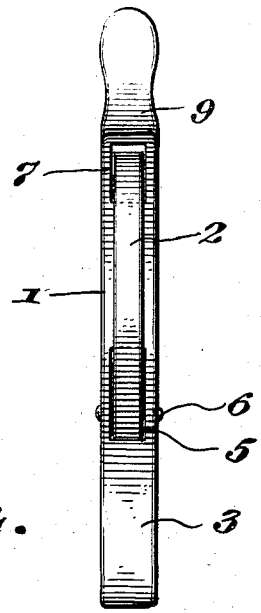
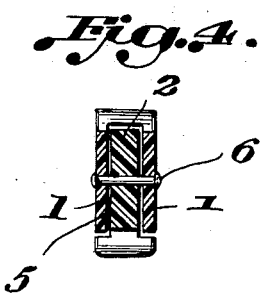
INVENTOR
Henry Gragg
BY Mason, Porter, Diller & Stewart
ATTORNEYS Patented Aug. 7, 1951

2,563,236

UNITED STATES PATENT OFFICE 2,563,236

PLASTIC CLAMP

Henry Gragg, Prescott, Ariz., assignor of one-fifth to Laurence S. Mason, Prescott, Ariz.

Application September 20, 1949, Serial No. 116,813

2 Claims. (Cl. 24—248)

The invention relates to new and useful improvements in a clamp having gripping jaws and operating arms which are locked in a set clamping position.

An object of the invention is to provide a clamp of the above type which is made of plastic material such as vinyl resin or similar thermoplastic wherein the arms attached to the jaws for operating the same have interlocking means for holding the jaws in a set position.

Another object of the invention is to provide a plastic clamp of the above type wherein one of the arms is arcuate in shape and extends through a passage in the other arm for interlocking engagement therewith.

Another object is to provide a plastic clamp of the above type wherein a keeper on one arm is engaged by teeth on the other arm for holding the jaws in set position and wherein said arm carrying the teeth is arcuate in shape and so dimensioned that the resiliency of the material will yieldingly hold the teeth in engagement with said keeper.

In the drawings which show by way of illustration one embodiment of the invention:

Figure 1 is a side view of the clamp with parts broken away to show the locking shoulder;

Figure 2 is an edge view of the same, the view being taken from the side thereof through which the locking member projects;

Figure 3 is an edge view taken from the other side of the clamp; and

Figure 4 is a section on the line 4—4 of Figure 1.

The improved clamp consists of two jaws 3 and 4. The jaw 3 has an arm 1 formed integral therewith which extends outwardly from the jaw and is provided with a passage 7 therethrough. The jaw 4 has integrally formed therewith an arcuate arm 2. This arm is arcuate all the way from the jaw 4 to the outer end thereof and the outer end is so dimensioned as to pass through the passage 7. The arms 1 and 2 cross each other and they are joined by a pivot 6. In the present illustrated embodiment of the invention the arm 3 is slotted as indicated at 5 and the arm 2 passes therethrough. Both of the arms and jaws are made preferably from a plasticized resinous material such as vinyl resin or similar thermoplastic. The jaws are so proportioned that they are substantially rigid while the arms 1 and 2 are dimensioned so that they are resilient. The inner wall of the passage 7 is shaped so as to form a rigid keeper 8. The arcuate arm has a series of teeth 10 extending across the inner face for engagement with the keeper for holding the jaws in set position. The arcuate arm is so shaped that the teeth 10 make yielding contact with the keeper 8 unless said arm is forced outwardly by pressure applied to the end thereof so that the teeth are released from engagement with the keeper. It is the resiliency of the arm 2 which normally holds the teeth in engagement with the keeper 8. When the arms are pressed towards each other the jaws are brought into engagement with the material which is to be clamped and after the jaws contact the material the arm 1 which is resilient may be moved into engagement with one of the teeth so that the jaws will grip the material very tightly through the resiliency of the arm 1.

The jaw 3 adjacent its end is provided with a cut-away portion 11 extending across the face of the jaw and the jaw 4 is provided with a cut-away portion 12 which faces the cut-away portion 11. There are like cut-away portions 13 and 14 further back on the jaws which face each other. This facilitates the gripping of material of varying thicknesses, and the clamping of article portions extending through the cut-away portions.

The arms 1 is extended as indicated at 9 to form a fingerpiece and the arcuate arm 2 is of a length so that it projects through the passage and beyond the arm 1. This greatly aids the operator in grasping the fingerpiece 9 and the end of the arcuate arm between the thumb and finger for springing the arm outwardly and releasing the teeth from the keeper.

It is obvious that minor changes in the details of construction may be made without departing from the spirit of the invention as set forth in the appended claims.

I claim:

1. A plastic clamp comprising a pair of clamping jaws, resilient arms formed integral with said jaws respectively, said arms crossing each other and pivoted together adjacent the jaws, one of said arms projecting outwardly from the pivotal connection and having a passage therethrough adjacent its outer end, the other arm being arcuate in shape from a point adjacent the pivot to the outer end thereof and extending outwardly and thence laterally through said passage, the inner wall of said passage being shaped so as to form a rigid keeper, said arcuate arm having a series of teeth extending across its inner face for engagement with the keeper for holding the jaws in a set position, the resiliency of the arcuate arm operating to hold the teeth in engagement with the keeper.

2. A plastic clamp comprising a pair of clamping jaws, resilient arms formed integral with said jaws respectively, said arms crossing each other and pivoted together adjacent the jaws, one of said arms projecting outwardly from the pivotal connection and having a passage therethrough adjacent its outer end, the other arm being arcuate in shape from a point adjacent the pivot to the outer end thereof and extending outwardly and thence laterally through said passage, the inner wall of said passage being shaped so as to form a rigid keeper, said arcuate arm having a series of teeth extending across its inner face for engagement with the keeper for holding the jaws in a set position, the resiliency of the arcuate arm operating to hold the teeth in engagement with the keeper, said arm with the passage being extended to provide a finger piece and said arcuate arm extending beyond the arm with the passage whereby the finger piece and the end of the arcuate arm may be grasped between th thumb and finger for releasing the arcuate arm from the keeper.

HENRY GRAGG.

REFERENCES CITED

The following references are of record in the file of this patent:

UNITED STATES PATENTS

| Number | Name | Date |
| --- | --- | --- |
| 546,538 | Joy | Sept. 17, 1895 |
| 832,317 | Hinds | Oct. 2, 1906 |
| 838,514 | Baker | Dec. 18, 1906 |
| 2,173,010 | De Amario | Sept. 12, 1939 |
| 2,261,005 | Thompson et al. | Oct. 28, 1941 |